United States Patent Office 3,733,251
Patented May 15, 1973

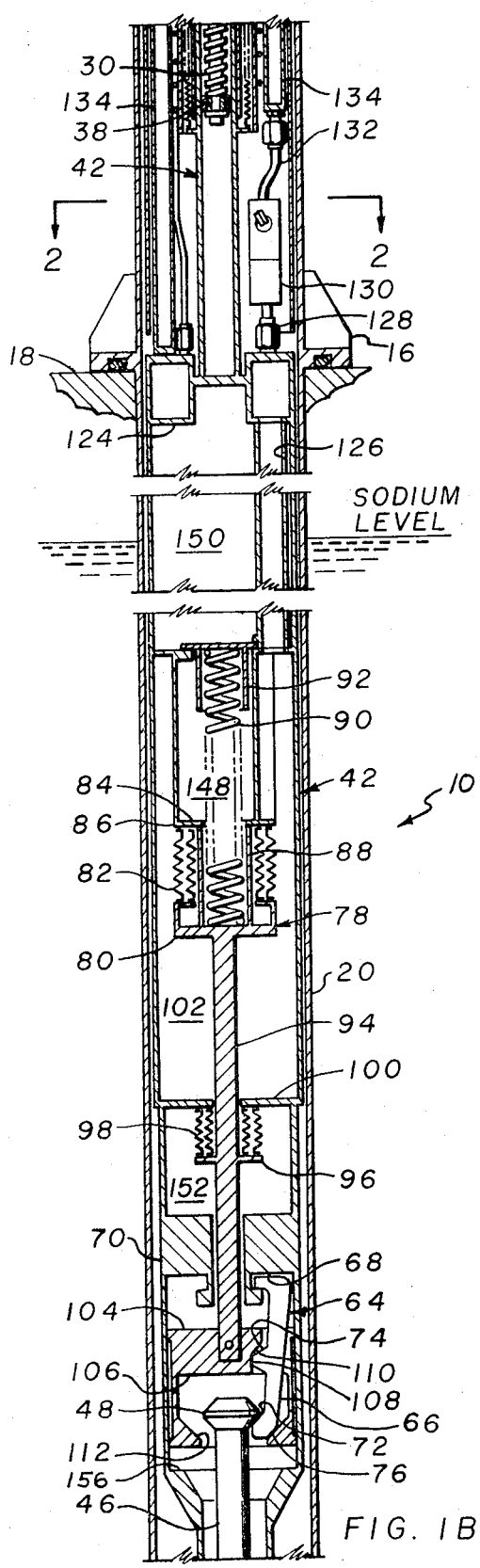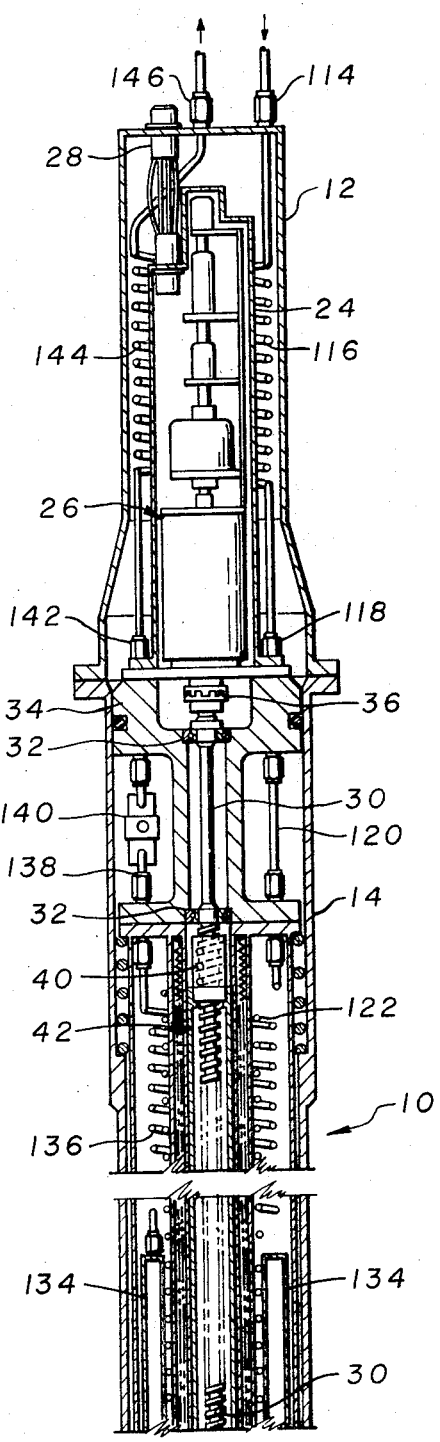
FIG. 1B
FIG. 1A

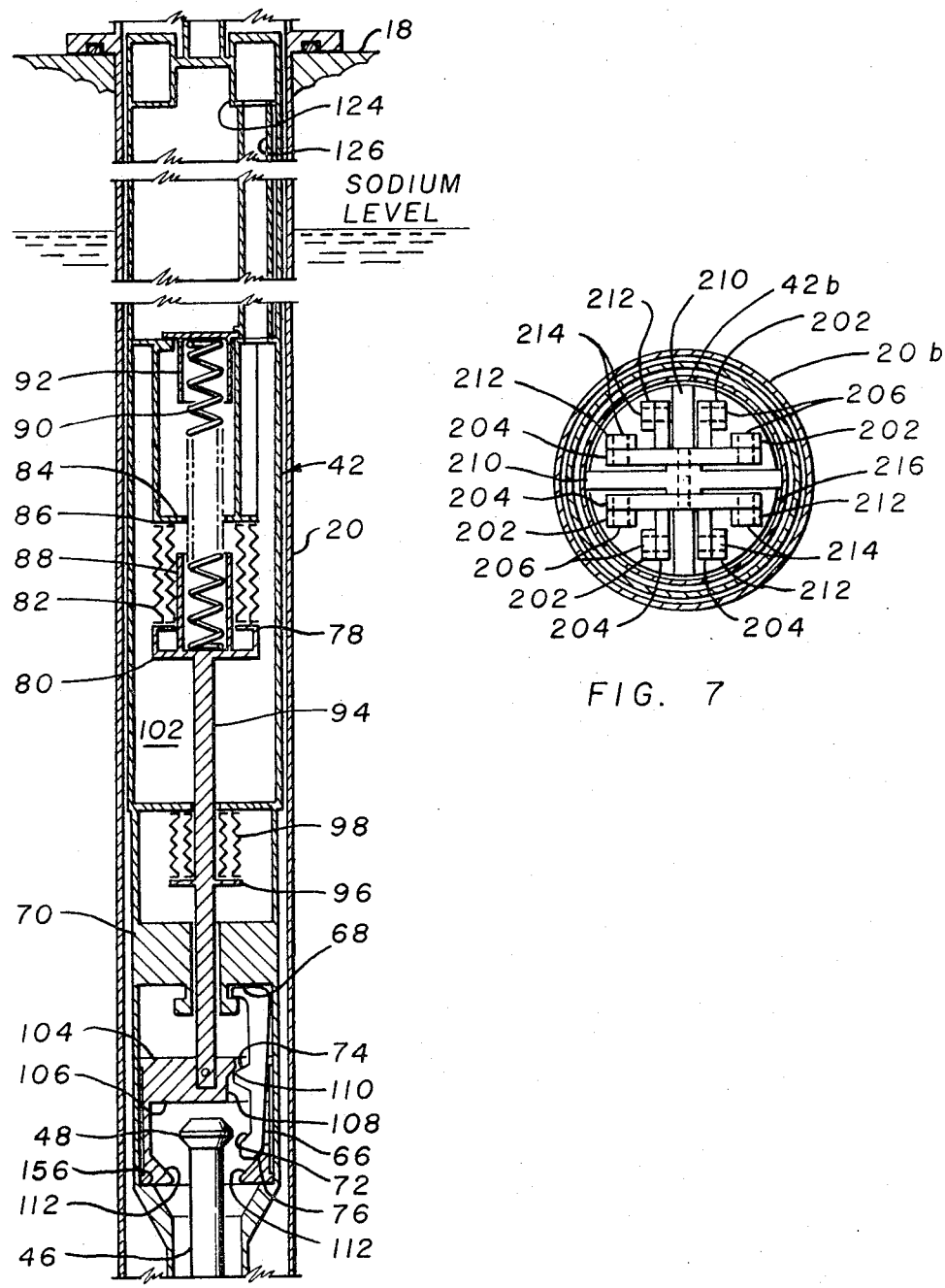

3,733,251
CONTROL ROD RELEASE MECHANISM
Jon C. Gilbertson, Hartford, and Raymond A. Gorsky, Bolton, Conn., assignors to Combustion Engineering, Inc., Windsor, Conn.
Filed June 22, 1971, Ser. No. 155,461
Int. Cl. G21c 7/08
U.S. Cl. 176—36 R
25 Claims

ABSTRACT OF THE DISCLOSURE

A control rod release mechanism utilizing a pneumatically actuated mechanical gripper device located immediately above the reactor core region and remotely connected to the control rod drive mechanism. The pneumatic system includes a pressure source which exerts a force on a gripper actuating member in a direction to initiate positive gripping action of a control rod extension shaft by the gripper device. The actuating member is spring biased towards a positive grip release initiating position so that release of the pressure of the pneumatic system will always serve to disconnect the control rod extension shaft from the gripper device.

BACKGROUND OF THE INVENTION

Power generation in a nuclear reactor is accomplished by initiating a self-sustaining chain reaction. The amount of fissionable fuel used in the chain reaction is such that the multiplication factor (ratio of neutrons produced by fission in each generation to the number of neutrons in the preceding generation) can be made more than unity. To control this multiplication factor, control rods are used to absorb neutrons within the reactor.

Control rods perform three fundamental functions. The rods must first provide a general reactivity level control to regulate power output of the reactor. Secondly, control rods must provide fine control of reactivity within very small increments to compensate for drifts in reactor operating conditions. The third function of control rods is to rapidly reduce the reactivity level within the reactor to below the critical self-sustaining level in the event of certain particular malfunctions. The control rod functions are generally accomplished by a series of long, reciprocating rods of uniform design arranged in spaced, parallel relationship, each rod being capable of performing all three functions depending upon the particular drive associated therewith.

The action of the control rods is controlled by pneumatic or electromechanical actuators connected to elongated extensions from jacketed neutron absorbing material which make up the rods. The actuators are generally located outside the reactor pressure vessel so that the drive components are not subjected to the high temperature and high radiation environment within the reactor itself. The actuators are connected to the absorption section extensions through releasable couplings so that under conditions in which core reactivity must be rapidly reduced (scram conditions) the extensions can be quickly released to permit the control rods to drop under the influence of gravity into the core to interrupt the chain reaction therein. The coupling to the elongated extensions is made at the actuator level, such as through a magnetic coupling or immediately below the actuator level (such as in the area just beneath the closure head) by a mechanical coupling means.

With the above arrangement there are scram conditions wherein distortions in the extension shaft could prevent the control rod from being inserted into the core and the necessary failsafe arrangement would, therefore, no longer exist. This distortion of the extension shaft could be caused by structural failure of the reactor support, the closure head, or the reactor vessel support, or by distortion in the upper core region. An explosion in the area of the control rod drives could also result in distortion which would prevent the necessary control rod scramming action.

SUMMARY OF THE INVENTION

There is herein provided a novel control rod release mechanism which is not subject to failure due to extension shaft distortion. This result is accomplished by utilization of a pneumatically actuated mechanical gripper device located immediately above the reactor core region and remotely connected to the control rod actuator. The pneumatic system includes a pressure source which exerts a force on a gripper actuating member in a direction to initiate positive gripping action of a control rod extension shaft by the gripping device. The actuating member is spring biased towards a positive grip release initiating position so that release of the pressure of the pneumatic system will always serve to disconnect the control rod extension shaft from the gripper device.

BRIEF DESCRIPTION OF THE DRAWINGS

FIGS. 1A, 1B and 1C represent an overall side elevation of a control rod arrangement incorporating the novel control rod release mechanism according to this invention.

FIG. 4 is a side elevation of the control rod arrangement similar to FIG. 1B showing the gripper mechanism in its release position.

FIG. 7 is a plan view taken along line 7—7 of FIG. 6.

DESCRIPTION OF THE PREFERRED EMBODIMENTS

Figure 1C:
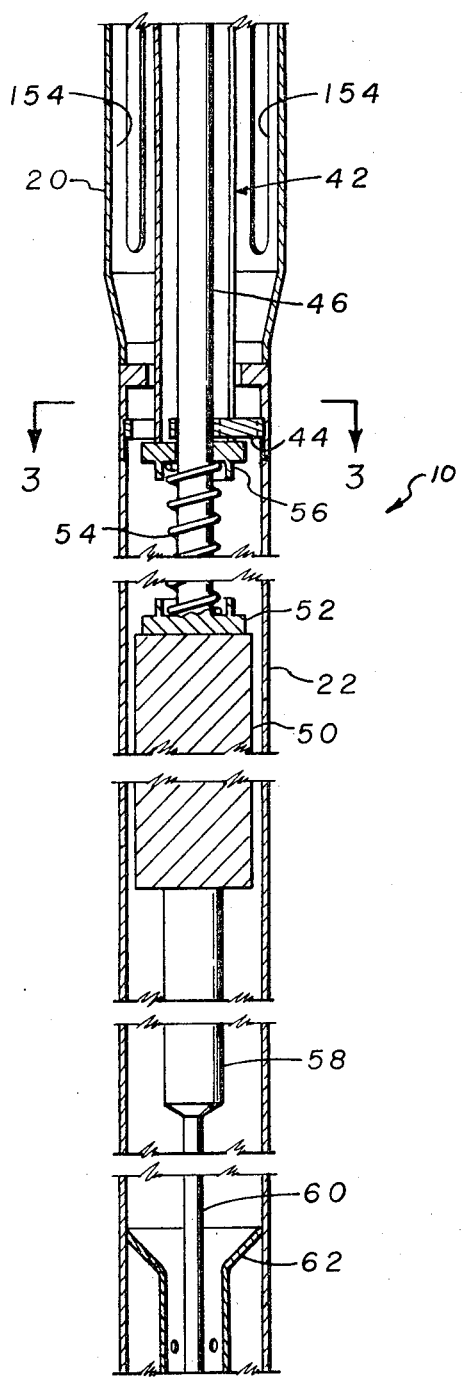
Figure 2:
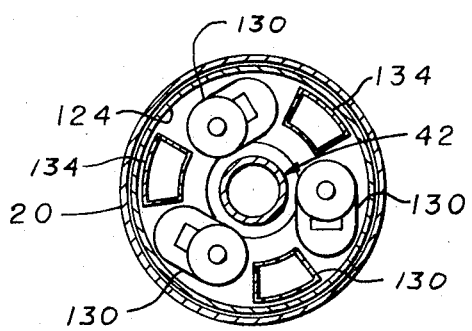
FIG. 2 is a plan view taken along line 2—2 of FIG. 1B.
Figure 3:
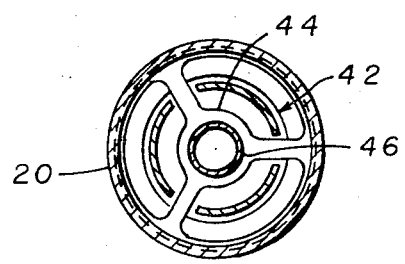
FIG. 3 is a plan view taken along line 3—3 of FIG. 1C.

Referring now to the drawings, FIGS. 1A, 1B and 1C show a control rod arrangement 10 for particular use in a liquid metal cooled nuclear reactor system. The arrangement 10 has a drive housing 12 fixed to an upper housing 14 which is secured by means of a flange 16 to the reactor vessel closure head 18. Extending below the closure head 18 into the reactor interior is a middle housing 20 which in turn is connected to a lower housing 22 which extends into the reactor power generating core region.

The drive housing 12 encloses a protective casing 24 for a drive motor arrangement 26. A flexible electrical connector 28 serves to connect electrical power from an external source to the drive motor arrangement 26. A drive shaft 30 is supported for rotation in bearings 32 in the frame 34 within the housing 14, the drive shaft 30 being connected to the drive motor arrangement 26 through a clutch 36. The shaft 30 extends downwardly through the upper housing 14 to a point just above the level of the reactor closure head 18 where the end thereof is supported in a bearing 38. The drive shaft 30 is of a screw type which engages a ball nut and screw coupling 40 which is integral with a control drive extension tube 42. The control drive extension tube 42 extends through the upper housing 14 and middle housing 20 to terminate within the lower housing 22 (FIG. 1C) at which point a rotating guide 44 fixed to the housing 22 is provided so as to prevent the extension tube 42 from rotating. Thus it is apparent that due to the rotational restraint of the extension tube 42, rotation of the drive shaft 30 will cause incremental reciprocation of the drive extension tube 42 through the interaction thereof with the ball nut and screw coupling 40, the length of reciprocatory travel being substantially the length of the drive shaft 30.

Extending into the control drive extension tube 42 is a poison section handling shaft 46 having a head portion 48 of somewhat larger diameter than the shaft 46. The shaft 46 is connected to the poison section 50 of the control rod arrangement 10 through a cap 52 which additionally serves as a spring seat for a scram assist spring 54. The scram assist spring 54 is mounted in the cap 52 at one end and is biased against a closure seat 46 for the control drive extension tube 42. Beneath the poison section 50 is a lower guide shaft 58 which has a reduced diameter portion 60 extending within a dashpot shock absorber 62. The dashpot absorber 62 serves to dampen the movement of the control drive extension tube 42 and poison section 50 of the control rod arrangement 10 upon necessary rapid scram movement into the reactor core region.

In order to connect the poison section handling shaft 46 to the control drive extension tube 42 to provide incremental vertical movement of the poison section 50 into and out of the reactor core for adjustment of reactivity while permitting a rapid scram action therefor, a releasable gripper mechanism 64 is located within the extension tube 42 immediately adjacent the head 48 of the shaft 46. The gripper mechanism 64 comprises a set of gripper jaws 66 (one shown) which are mounted in recesses 68 of a gripper jaw holding section 70 integrally formed with the extension tube 42. The mounting is accomplished such that the jaws 66 are capable of radially pivotable movement. Each of the gripper jaws 66 have a gripping surface 72 which selectively serve to grip the head portion 48 of the handling shaft 46. Each of the jaws 66 additionally have an unlatching cam surface 74 and a latching cam surface 76 which interact with a gripper release mechanism 78 to position the jaws 66 for selective gripping or release of the poison section handling shaft 46.

The gripper release mechanism 78 has a first piston surface 80 to which a first double bellows arrangement 82 is fixed. The bellows arrangement 82 connects to an end plate 84 of a tubular projection 86 which is integral with the control drive extension tube 42 so as to provide a flexible seal between the first piston surface 80 and the control drive extension tube 42. It is noted that a double bellows arrangement is shown for the purposes of insured safety while, in fact, a single bellows arrangement of suitable construction would be similarly operative. Above the first piston surface 80 and integral therewith is a tubular projection 88 which seats against the projection end plate 84 when the gripper mechanism 64 is in its retracted positive grip initiating position, the end plate 84 serving as an end stop for the gripper release mechanism 78. The projection 88 also serves as a seat for a gripper release spring 90 which is seated at its opposite end in a seat 92 formed in the control drive extension tube 42. Extending beneath the piston surface 80 on the opposite side of the tubular projection 88 is a shaft 94 which has a second piston surface 96 located intermediate its length. A second double bellows 98 (may be a single bellows arrangement as noted above) is sealingly connected between the second piston surface 96 and a lateral projection 100 from the control drive extension tube 42. The first double bellows 82 and the second double bellows 98 thus serve to form a first pressure chamber 102 immediately above the reactor core region for the purposes to be explained hereinbelow.

The opposite end of the shaft 94 is connected to a gripper jaw actuator 104. The actuator 104 has a hollow portion 106 into which the poison section handling shaft 46 extends. The actuator 104 has openings 108 (one shown) which extend through the main body thereof and through which the gripper jaws 66 extend into the hollow portion 106. The openings 108 have unlatching cam surfaces 110 formed therein, while the lower portion of the actuator 104 has latching cam surfaces 112 formed integral therewith.

In order to actuate the gripper release mechanism 78 a pneumatic pressure system is provided. A pneumatic pressure inlet 114 is connected through the drive housing 12 to inlet tubing 116 which connects through a coupling 118 to a segment of inlet tube 120 located in the upper housing 14. The inlet tube 120 is connected to a helically wound section of inlet tubing 122 which surrounds the upper portion of the control drive extension tube 42 and connects to a header assembly 124 integrally formed within the extension tube 42. The helical winding of tubing 122 is necessary to permit the reciprocal movement of the control drive extension tube 42. Extending from the header 124 is a passage 126 which connects to the first pressure chamber 102 to supply pneumatic pressure thereto.

Outlet connections 128 (one shown) connects solenoid pressure release valves 130 to the header arrangement 124. Outlet tubing 132 passes from the valves 130 to pressure vent holdup cans 134 which are capable of storing substantially the complete volume of pneumatic fluid which would be in the first chamber 102 at its working pressure. The holdup cans 134 are connected through helically wound outlet tubing 136 (to permit vertical movement of control drive extension tube 42) to a coupling 138 which connects to holdup can pressure release valves 140. The valves 140 are connected through connections 142 to outlet tubing 144 which passes to a pneumatic pressure outlet 146 in the drive housing 12.

The gripper release mechanism 78 is actuated to control the gripper mechanism 64 in the following manner. Pneumatic pressure at approximately 200 p.s.i., supplied through the inlet 114, inlet tubing 116, 120, and 122, is admitted to the chamber 102 from the header 124. This pressure acts on the first piston surface 80 to move the tubular projection 88 against the bias of the gripper release spring 90 against the projection end plate 84. The chamber 148 above the first piston 80 is in fluid communication with the chamber 150 within the interior of the control drive extension tube 42 which is at substantially atmospheric pressure. Pressure on the second piston surface 96 within a chamber 152 on the opposite side of the second bellows 98 from chamber 102 is that of the sodium (or other liquid metal coolant) which passes into the interior of the middle housing 20 through the openings 154 in the lower end thereof (FIG. 1C). The pressure of the liquid sodium is approximately 20 p.s.i. With the piston 80 in the retracted position, the gripper jaw actuator 104 will be moved upwardly such that the latching cam surfaces 112 will engage the latching cam surfaces 76 of the gripper jaws 66 to move the jaws radially inwardly to grip the head 48 of the poison section handling shaft 46.

As soon as conditions are detected in which it is necessary to scram the control rod arrangement 10, the pressure in the first chamber 102 will be released by actuation of the solenoid pressure release valves 130. The volume of pneumatic fluid within the chamber 102 will be stored in the pressure vent holdup cans 134 so that any possible radioactive contamination thereof will not be immediately vented to the atmosphere. As soon as the pressure within the chamber 102 is released, the residual pressure in chamber 102 acting on the underside of the first piston 80 and the pressure in chamber 152 on piston 96 will be overcome by the bias of the gripper release spring 90 and the first and second bellows seals 82, 98 (sized to insure overcoming of the residual pressure in chamber 102 and pressure in chamber 152) to force the shaft 94 downwardly driving the gripper jaw actuator 104 against the shoulder 156 of the control drive extension tube 42 (see FIG. 4). As the gripper jaw actuator 104 moves downwardly, the unlatching cam surfaces 110 thereof will engage the unlatching cam surfaces 74 of the gripper jaws 66 to move the jaws radially outwardly so as to release their grip on the head 48 of the poison section handling shaft 46 to cause a positive disengagement thereof. The poison section 50 will thus be free to fall under the influence of gravity, with additional impetus being provided by the scram assist spring 54, into the reactor core region in order to scram the reactor and terminate any abnormally dangerous condition which exists therein.

Figure 5:
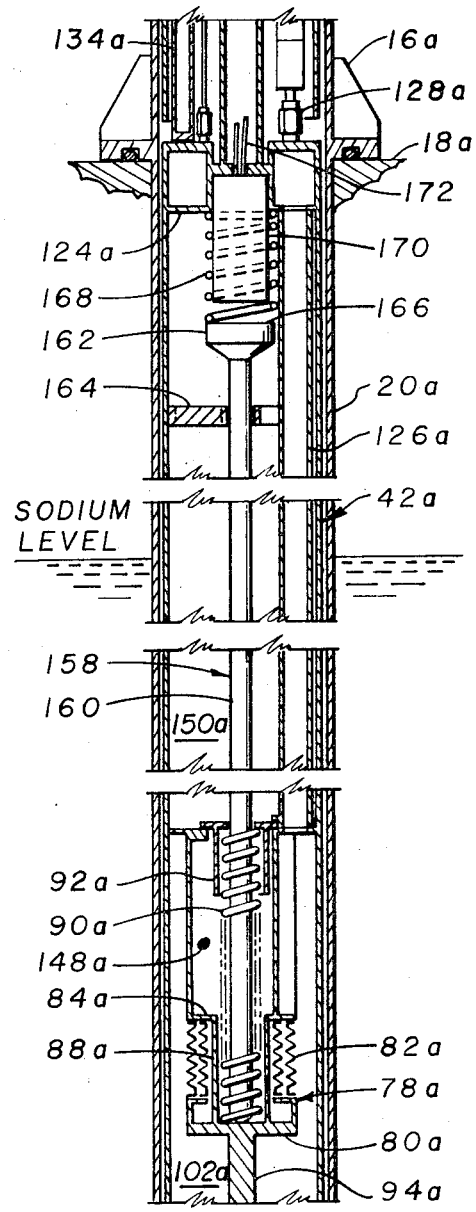
FIG. 5 is a side elevation of a modified form of the control rod release mechanism according to this invention.

A secondary or backup gripper release mechanism 158, to normally operate simultaneously with the primary gripper release mechanism, is shown in FIG. 5. The elements of this embodiment which have equivalent elements in the above-described embodiment are designated by similar numerals having the suffix "a." The secondary gripper release mechanism 158 comprises a shaft 160 having a head 162, the shaft 160 being guided at its upper level by a guide 164 fixed to the control guide extension tube 42a. The head 162 has a shoulder 166 which serves to seat a secondary gripper release spring 168 which is positioned between the shoulder 166 and the bottom portion of the header 124a. Within the confines of the spring 168 there is located an electromagnet 170 which has electrical connections 172 thereto. The opposite end of the shaft 160 extends through the primary gripper release spring 90a so as to abut the upper surface of the first piston 80a.

In operation the secondary gripper release mechanism 158 functions as follows. When the first piston 80a is in its retracted positive grip initiating position, the shaft 160 of the secondary gripper release mechanism 158 will be similarly retracted. In this position the electromagnet 170 will be activated to hold the head 162 of the release mechanism 158 cocked in the retracted position. Under scram conditions, such as would occur on a loss of power, the electromagnet would release the head 162 and the action of the spring 168 against the shoulder 166 of the head 162 would force the shaft 160 downwardly to exert downward pressure on the piston 80a to assist the primary gripper release mechanism 78a in driving it to its grip release initiating position in the same manner as described above with reference to FIGS. 1–4.

Figure 6:
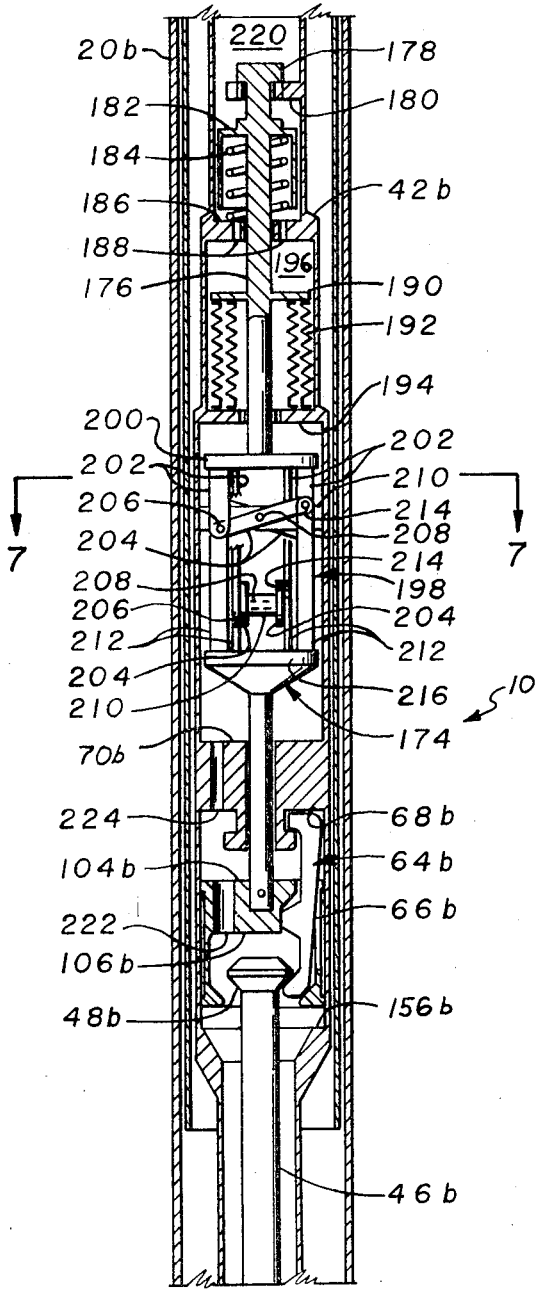
FIG. 6 is a side elevation of another modified form of the control rod release mechanism according to this invention.

FIGS. 6 and 7 show a modified gripper release mechanism 174. Elements of this embodiment corresponding to like elements in the first described embodiment are denoted by similar numerals having the suffix "b." The gripper release mechanism 174 has a first shaft 176 having head 178 thereon which cooperates with a guide 180 to limit the movement of the shaft 176 both longitudinally and rotationally. Beneath the head 178 is a seat 182 for a scram assist spring 184 which acts against a first axial guide partition 186 integral with the control drive extension tube 42b. The partition 186 has ports 188 therethrough permitting fluid communication to the area beneath the guide partition 186. Intermediate the length of the shaft 176 is a piston 190 which has a double bellows arrangement 192 sealingly connected thereto. As previously noted, the bellows arrangement 192 may be a single bellows arrangement. The opposite end of the bellows 192 is connected to a second axial guide partition 194 of the extension tube 42b so as to form a chamber 196 above the piston 190 in the region immediately above the reactor core.

Fixed to the opposite end of the shaft 176 is a direction reversing mechanism 198. The direction reversing mechanism 198 has a first head 200 which has extending downwardly therefrom four vertical arms 202. Cross arms 204 are connected to the vertical arms 202 by pivot pins 206. The cross arms 204 are in turn pivotally connected by means of pins 208 to lateral braces 210, the braces 210 being fixedly attached to the extension tube 42b. At the opposite ends of the cross arms 204 are a set of vertical arms 212 connected thereto by means of pivot pins 214, the arms 212 extending from and being connected to a second head 216. The second head 216 has extending therebelow a second shaft 218 which is connected to the gripper jaw actuator 104b so that the actuator 104b will control the gripper mechanism 64b in a manner similar to that as described with reference to the gripper mechanism of FIGS. 1–4.

The operation of the gripper release mechanism 174 is as follows. Pneumatic pressure of approximately 200 p.s.i. is admitted through a pressure inlet chamber 220 to pressurize the chamber 196 thus exerting a downward force on the piston 190. In order that a downward thrust on the gripper mechanism 64b will produce a release of the poison section handling shaft 46b (safety requirements dictate that loss of pressure should not affect the ability of scram the reactor) the change of direction mechanism 198 is necessary. This mechanism operates in the following manner. When the pressure in the chamber 196 forces the piston 190 downwardly, the head 200 and vertical arms 202 fixed to the shaft 176 will correspondingly be moved downwardly. This will cause pivoting of the cross arms 204 about their pivot pins 208 which are fixed to the lateral braces 210. This will pull the vertical arms 212 upwardly moving the head 216 which is fixed thereto in an upward direction. The shaft 218 will therefore be moved upwardly so as to accomplish an upward movement of the gripper jaw actuator 104b to move it to its gripper jaw actuating position. Working pressure beneath the piston 190 is that of the sodium or other liquid metal coolant which is approximately 20 p.s.i. The coolant is in fluid communication with the underside of the piston by means of ports 222 and 224 which are located respectively in the jaw actuator 104b and the gripper jaw holding section 70b.

Under scram conditions, the pressure in the chamber 196 will be released and the shaft 176 will move upwardly under the bias of the scram assist spring 184 (acting against the seat 182) and the bellows seal 192. Upward movement of the shaft 176 will cause the head 200 and vertical arms 202 fixed thereto to move upwardly. The direction reversing mechanism 198 will thus be actuated in a manner opposite to that described above so that the shaft 218 connected to the second head 216 will be moved downwardly to drive the jaw actuator 104b downwardly causing a release of the poison section extension shaft 46b by the gripper mechanism 64b.

Thus it can be seen from the foregoing that there is herein provided a novel control rod release mechanism which would not be affected by distortion in the control element extension shaft. The release mechanism is located immediately above the reactor core region and is pneumatically actuated to effect selective gripping action of the poison section of the control rod. The pneumatic pressure system includes a pressure source which exerts a force on a gripper actuating member in a direction to initiate positive gripping action of a control rod extension shaft by the gripper device. The actuating member is spring biased towards a positive grip release initiating position so that release of the pressure of the pneumatic system will always serve to disconnect the control rod extension shaft from the gripper device.

While these preferred embodiments of the invention have been shown and described, it will be understood that they are merely illustrative and that changes may be made without departing from the scope of the invention as claimed.

What is claimed is:

1. In a control rod for a liquid metal cooled nuclear reactor, said control rod having a liquid metal cooled poison section biased toward the reactor core, an incremental drive mechanism for positioning said poison section relative to said reactor core, and a gripper mechanism located immediately above the reactor core region for positively releasably coupling said drive mechanism to said poison section, a pneumatically actuated gripper release mechanism comprising:

a pressurizable chamber adjacent said gripper mechanism; means for selectively pressurizing and depressurizing said chamber; piston means forming a portion of one wall of said chamber; biasing means biasing said piston means in a direction against said pressure in said chamber; sealing means, connected to said piston means, forming an additional portion of said wall of said chamber, said formed wall serving to separate said pressurizable chamber from said area in which said liquid metal coolant is permitted to flow; and means interconnecting said piston means with said gripper mechanism such that pressure on said piston will overcome said biasing means to cause movement thereof to initiate positive gripping action by said gripper mechanism of said poison section, and release of said pressure will cause movement of said piston means under action of said biasing means to initiate positive release action by said gripper mechanism of said poison section.

2. The apparatus of claim 1 wherein said means for selectively pressurizing and depressurizing said chamber includes a pressure header in fluid communication with said pressure chamber, said header being formed as an integral part of said incremental drive mechanism; a pressure inlet coupling; inlet tubing connecting said inlet coupling and said pressure header; holdup cans for receiving fluid from said header and said pressure chamber; solenoid operated pressure relief valves connected between said header and said holdup cans for controlling passage of fluid from said header and pressure chamber to said cans; solenoid operated holdup can pressure relief valves for controlling relief of pressure from said holdup cans; and outlet tubing connecting said holdup cans to said holdup can pressure relief valves.

3. The apparatus of claim 2 wherein said inlet tubing and said outlet tubing are, at least in part, in the geometric configuration of a flexible helix so as to permit longitudinal movement of said header with said incremental drive mechanism.

4. The apparatus of claim 3 wherein the said sealing means comprises a metallic bellows arrangement to permit flexure of the sealing means while maintaining the necessary seal.

5. The apparatus of claim 4 wherein said bellows arrangement comprises two internested metallic bellows.

6. The apparatus of claim 3 wherein said piston means comprises a first piston, a tubular projection extending from one surface of said piston, an elongated shaft extending from the opposite surface of said piston, a second piston integral with said shaft at its opposite end, said second piston having less surface area than said first piston.

7. The apparatus of claim 6 wherein said incremental drive mechanism has a first lateral projection adjacent said tubular projection to serve as a stop therefor, and a second lateral projection adjacent said second piston, and wherein said sealing means are connected between said first piston and said first lateral projection and between said second piston and said second lateral projection.

8. The apparatus of claim 7 wherein said first lateral projection has a spring seat formed integral therewith, and wherein said biasing means includes a scram assist spring located between said seat and said first piston.

9. The apparatus of claim 8 wherein said means interconnecting said piston means with said gripper mechanism comprises a second shaft integral with said second piston and extending from the opposite side thereof from said first mentioned shaft, and a gripper mechanism actuator means connected to said second shaft for movement therewith.

10. The apparatus of claim 9 wherein said gripper mechanism actuator means comprises a body member having a hollow portion, said hollow portion surrounding an upper portion of said poison section, said body further having a latching cam surface and an unlatching cam surface formed integrally therewith for initiating latching and unlatching action respectively of said gripper mechanism upon selective movement of said body member.

11. The apparatus of claim 10 wherein there is provided a secondary gripper release mechanism having an elongated shaft, one end of said elongated shaft in juxtaposition with said first piston, a head on the opposite end of said shaft, an electromagnet engagable with said head for maintaining said secondary release mechanism cocked in a first position upon energization of said electromagnet and releasing said secondary release mechanism upon deenergization thereof to permit movement of said secondary release mechanism to a second position imparting a force on said first piston, and a biasing means acting on said head in a force direction opposite to that of said electromagnet so that upon deenergization thereof said second release mechanism will be moved by said biasing means to said second position.

12. The apparatus of claim 11 wherein said sealing means comprises a metallic bellows arrangement to permit flexure of said sealing means while maintaining the necessary sealing.

13. The apparatus of claim 12 wherein said bellows arrangement comprises two internested metallic bellows.

14. The apparatus of claim 3 wherein said piston means comprises a shaft, a piston surface integral therewith and intermediate the length thereof, a spring seat fixed to one end of said shaft, and a direction reversing mechanism fixed to the opposite end of said shaft.

15. The apparatus of claim 14 wherein said incremental drive mechanism has a first lateral projection located between said piston surface and said spring seat and a second lateral projection located between said piston surface and said reversing mechanism, and wherein said biasing means includes a scram assist spring inserted between said first lateral projection and said spring seat, and said sealing means is connected between said piston surface and said second lateral projection.

16. The apparatus of claim 15 wherein said reversing mechanism comprises a first head fixed to said aforementioned shaft, a second head fixed to said means interconnecting said piston means with said gripper mechanism, at least one first vertical arm extending from said first head toward said second head, at least one second vertical arm extending from said second head toward said first head, at least one lateral brace fixed to said incremental drive mechanism, and at least one cross arm pivotally connected at its midpoint to said lateral brace and at its opposite ends to said at least one first vertical arm and said at least one second vertical arm.

17. The apparatus of claim 16 wherein said means interconnecting said piston means with said gripper mechanism comprises a second shaft integral with said second head and extending from the opposite side thereof from said first mentioned shaft, and a gripper mechanism actuator means connected to said second shaft for movement therewith.

18. The apparatus of claim 17 wherein said gripper mechanism actuator means comprises a body member having a hollow portion, said hollow portion surrounding an upper portion of said poison section, said body further having a latching cam surface and an unlatching cam surface formed integrally therewith for initiating latching and unlatching action respectively of said gripper mechanism upon selective movement of said body member.

19. The apparatus of claim 18 wherein the said sealing means comprises a metallic bellows arrangement to permit flexure of said sealing means while maintaining the necessary seal.

20. The apparatus of claim 19 wherein said bellows arrangement comprises two internested metallic bellows.

21. A control rod for a liquid metal cooled nuclear reactor comprising: a housing, at least one opening in the lower portion thereof for admission of coolant to the interior of said housing; a reciprocable neutron poison section for control of reactivity within the reactor core, said poison section located within said control rod housing, an extension member extending vertically from said poison section; a control drive extension tube located within said control rod housing and constrained for reciprocal movement therein, said control drive extension tube controlling the vertical position of said poison section; a drive mechanism for reciprocating said control drive extension tube, said drive mechanism having a drive motor, a drive shaft of a screw-shaped configuration driven by said drive motor, a ball nut engaging said drive shaft, said ball nut being fixed to said control drive extension tube; a pivotable jaw type gripper mechanism carried by said control drive extension tube and located therein in the area immediately above the reactor core region, said gripper mechanism selectively coupling said control drive extension tube to said poison section extension member; a pneumatically actuated gripper release mechanism located immediately adjacent said gripper mechanism, said gripper release mechanism having a first piston, a scram assist spring within said control drive extension tube for biasing said first piston toward a positive gripper mechanism release actuating position, a first metallic bellows sealing arrangement sealingly connecting said first piston to said control drive etxension tube, a second piston axially spaced from said first piston and located between said first piston and said gripper mechanism, said second piston having less working surface area than said first piston, a second metallic bellows sealing arrangement sealingly connecting said second piston to said control drive extension so as to establish a pneumatic pressure chamber between said first piston and said second piston, a gripper mechanism actuator fixed to said second piston for movement therewith and in juxtaposition with said gripper mechanism to actuate said gripper mechanism on movement of said piston, a source of pneumatic pressure in fluid communication with said pneumatic pressure chamber and means for selectively controlling pressure from said chamber such that a supply of pressure thereto from said source will move said first and second pistons in a direction such that said gripper mechanism actuator will actuator said gripper mechanism to a positive gripping position and pressure release from said chamber will permit said first and second pistons to be moved under the bias of said scram assist spring such that said gripper mechanism actuator will actuate said gripper mechanism to a positive release position.

22. The apparatus of claim 21 wherein the means for selectively controlling presure from said source to said pneumatic chamber includes a pressure header in fluid communication with said pressure chamber, said header being formed as an integral part of said control drive extension tube; a pressure inlet coupling; inlet tubing connecting said inlet coupling and said pressure header; holdup cans for receiving fluid from said header and said pressure chamber; solenoid operated pressure relief valves connected between said header and said holdup cans for controlling passage of fluid from said header and pressure chamber to said cans; solenoid operated holdup can pressure relief valves for controlling relief of pressure from said holdup cans; and outlet tubing connecting said holdup cans to said holdup can pressure relief valves.

23. The apparatus of claim 22 wherein there is further provided a secondary gripper release mechanism having an elongated shaft, one end of said elongated shaft in juxtaposition with said first piston, a head on the opposite end of said shaft, an electromagnet engageable with said head for maintaining said secondary release mechanism cocked in a first position upon energization of said electromagnet and releasing said secondary release mechanism upon deenergization thereof to permit movement of said secondary release mechanism to a second position imparting a force on said first piston, and a biasing means acting on said head in a force direction opposite to that of said electromagnet so that upon deenergization thereof said second release mechanism will be moved by said biasing means to said second position.

24. A control rod for a liquid metal cooled nuclear reactor comprising: a housing, at least one opening in the lower portion thereof for admission of coolant to the interior of said housing; a reciprocable neutron poison section for control of reactivity within the reactor core, said poison section located within said control rod housing, an extension member extending vertically from said poison section; a control drive extension tube located within said control rod housing and constrained for reciprocal movement therein, said control drive extension tube controlling the vertical position of said poison section; a drive mechanism for reciprocating said control drive extension tube, said drive mechanism having a drive motor, a drive shaft of a screw-shaped configuration driven by said drive motor, a ball nut engaging said drive shaft, said ball nut being fixed to said control drive extension tube; a pivotable jaw type gripper mechanism carried by said control drive extension tube for selectively coupling said control drive extension tube to said poison section extension member; a pneumatically actuated gripper release mechanism having a shaft, a piston surface integral therewith and intermediate the length thereof, a metallic bellows sealing arrangement sealingly connecting said piston to said control drive extension tube to form a pressure barrier within said control drive extension tube, a spring seat fixed to one end of said shaft, a scram assist spring within said control drive extension tube acting against said spring seat to bias said piston toward a positive gripper mechanism release actuating position, a direction reversing mechanism fixed to the opposite end of said shaft, said direction reversing mechanism having a first head fixed to said aforementioned shaft, a second head fixed to said means interconnecting said piston means with said gripper mechanism, at least one first vertical arm extending from said first head toward said second head, at least one second vertical arm extending from said second head toward said first head, at least one lateral brace fixed to said control drive extension tube, and at least one cross arm pivotally connected at its midpoint to said lateral brace and at its opposite ends to said at least one first vertical arm and said at least one second vertical arm, a gripper mechanism actuator fixed to said second head for movement therewith and in juxtaposition with said gripper mechanism to actuate said gripper mechanism on movement of said head, a source of pneumatic pressure in fluid communication with said one side of said pressure barrier and means for selectively controlling pressure from said one side of said pressure barrier such that a supply of pressure thereto from said source will move said piston in a direction such that said gripper mechanism actuator will actuate said gripper mechanism to a positive gripping position and pressure release from said one side of said pressure barrier will permit said piston to be moved under the bias of said scram assist spring such that said gripper mechanism actuator will actuate said gripper mechanism to a positive release position.

25. The apparatus of claim 22 wherein said means for selectively controlling pressure from said source to said one side of said pressure barrier includes a pressure header in fluid communication with said presure chamber, said header being formed as an integral part of said control drive extension tube; a pressure inlet coupling; inlet tubing connecting said inlet coupling and said pressure header; holdup cans for receiving fluid from said header and said pressure chamber; solenoid operated pressure relief valves connected between said header and said holdup cans for controlling passage of fluid from said header and pressure chamber to said cans; solenoid operated holdup can pressure relief valves for controlling relief of pressure from said holdup cans; and outlet tubing connecting said holdup cans to said holdup can pressure relief valves.

References Cited

UNITED STATES PATENTS

| 3,139,384 | 6/1964 | Filloleau et al. | 176—36 |
| 3,012,542 | 12/1961 | Miller | 176—36 |

CARL D. QUARFORTH, Primary Examiner

H. E. BEHREND, Assistant Examiner

U.S. Cl. X.R.

176—36 C; 294—86.15